United States Patent [19]
Murayama et al.

[11] Patent Number: 5,532,682
[45] Date of Patent: Jul. 2, 1996

[54] CONTROL DATA TRANSMISSION SYSTEM

[75] Inventors: Masami Murayama, Yokohama; Shuji Yoshimura; Tetsuo Kawamata, both of Kawasaki; Atsushi Yoshioka, Yokohama, all of Japan

[73] Assignee: Fujitsu Limited, Kawasaki, Japan

[21] Appl. No.: 110,209

[22] Filed: Aug. 23, 1993

Related U.S. Application Data

[63] Continuation of Ser. No. 743,887, Aug. 12, 1991, abandoned.

[30] Foreign Application Priority Data

Aug. 10, 1990 [JP] Japan ..................... 2-210398

[51] Int. Cl.⁶ ...................................... G05B 23/02
[52] U.S. Cl. ................. 340/825.06; 340/825.07; 370/110.1
[58] Field of Search ................... 340/825.03, 825.04, 340/825.06, 825.07, 825.14, 825.20, 825.62; 370/60, 60.1, 61, 66, 67, 85.1, 85.9, 82, 83, 99, 94.1, 110.1, 58.1, 58.2, 58.3

[56] References Cited

U.S. PATENT DOCUMENTS

| | | | |
|---|---|---|---|
| 2,946,044 | 7/1960 | Bolgiano, Jr. et al. | 370/110.1 |
| 3,582,906 | 6/1971 | Beausoleil et al. | 395/275 |
| 4,683,534 | 7/1987 | Tietjen et al. | 395/325 |
| 5,029,124 | 7/1991 | Leahy et al. | 395/325 |
| 5,109,494 | 4/1992 | Ehlig et al. | 395/325 |
| 5,119,482 | 6/1992 | Lloyd | 395/325 |

FOREIGN PATENT DOCUMENTS

2-98260  4/1990  Japan .

*Primary Examiner*—John K. Peng
*Assistant Examiner*—Andrew Hill
*Attorney, Agent, or Firm*—Staas & Halsey

[57] ABSTRACT

A control data transmission system controls an electronic switching system with few signal lines. Control data are split into a plurality of fixed-length bit blocks. The control data sequence number specification signals identify the fixed-length bit blocks. The control data sequence number specification signals are paired with corresponding control data signals carrying the contents of one of the fixed-length bit blocks and a control data validity specification signal for validating transmission of the control data. The control data sequence number specification signals are decoded and the contents of respective bit blocks carried by the control data signals are stored according to the decoding result and the control data validity specification signal. When the contents of the fixed-length bit blocks carried by the control data signals for one unit of control data are stored, the control data are analyzed.

4 Claims, 7 Drawing Sheets

CONTROL DATA TRANSMISSION SYSTEM

This application is a continuation of application Ser. No. 07/743,887, filed Aug. 12, 1991, now abandoned.

BACKGROUND OF THE INVENTION

This invention pertains to a control data transmission system for an electronic switching system, and more particularly to a control data transmission system capable of multiple kinds of control signals over a small number of lead lines.

Presently, most wire communication networks comprise an electronic switching systems. An exchange machine of such an electronic switching system comprises a block called a communication path or channel system (SP system) for handling a body of information such as communication data and a block called a control system (CP system) for handling control data for controlling the channel system. An electronic switching system functions by exchanging control data between these two systems.

Figure 1:
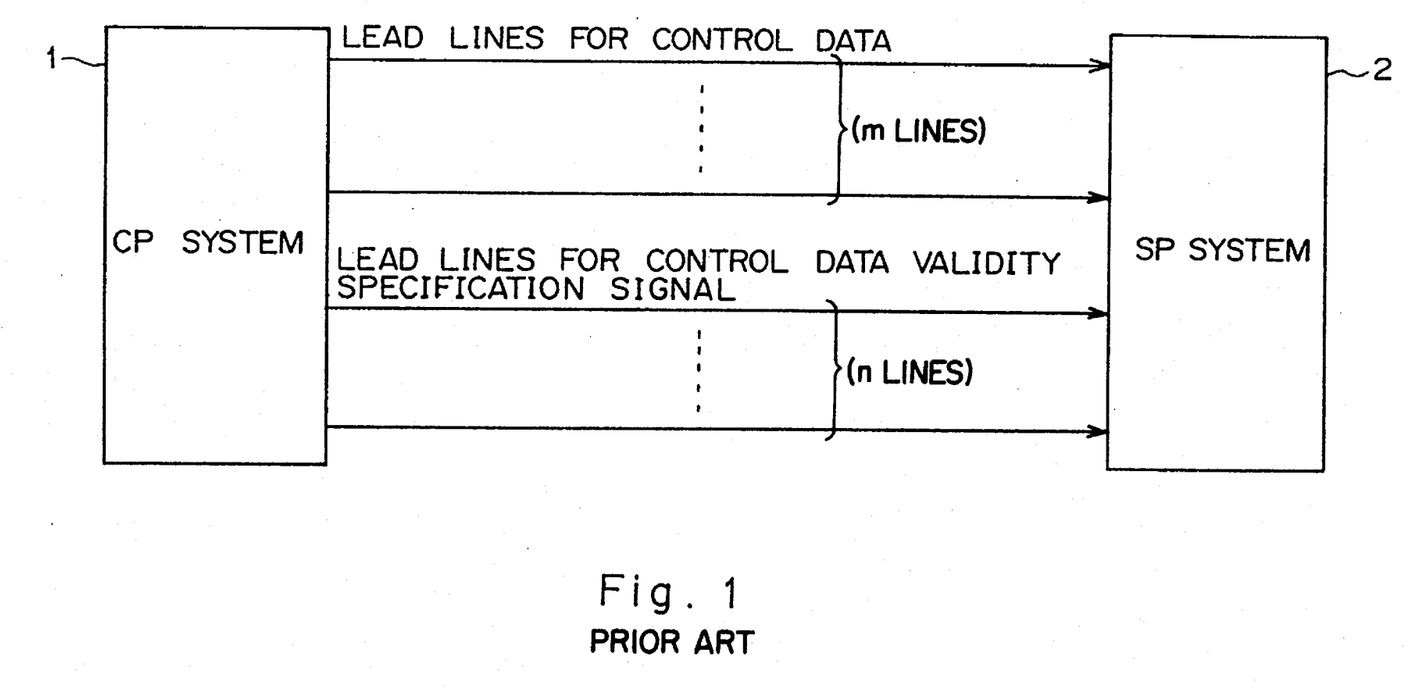
FIG. 1 is a conceptual view for explaining a conventional control data transmission system in which a CP system controls an SP system.

FIG. 1 is a conceptual view for explaining a conventional control data transmission system in which a CP system controls an SP system.

In FIG. 1, m lead lines for control data and n lead lines for control data validity specification signals connect CP system 1 with an SP system 2.

Here, an example is considered, in which a unit of control data comprising 32 bits is transmitted in two separate blocks of 16 bits, i.e. m=16, and n=2.

Figure 2:
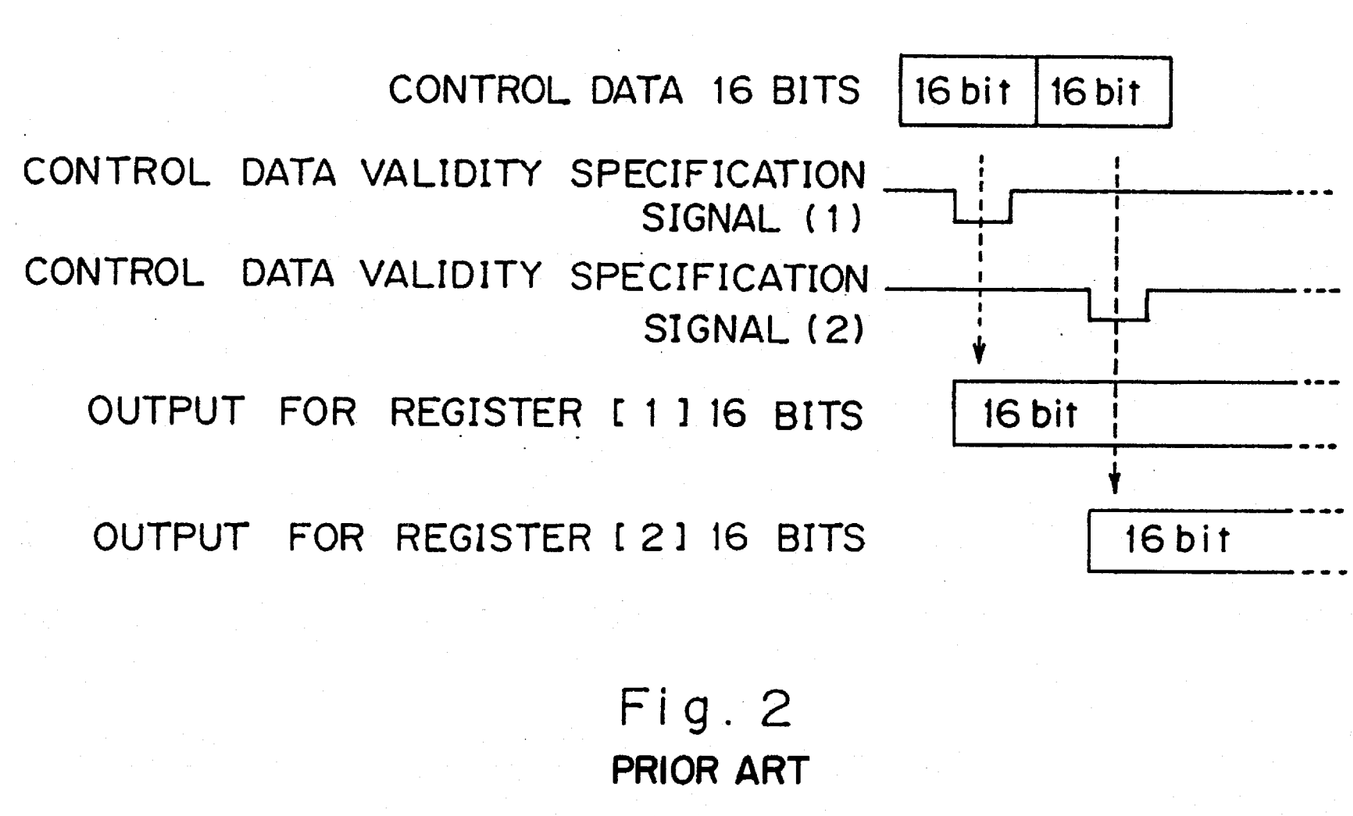
FIG. 2 is a timing chart for explaining the control actions of the conventional control data transmission system.

FIG. 2 is a timing chart for explaining the control actions of the transmission system.

Figure 3:
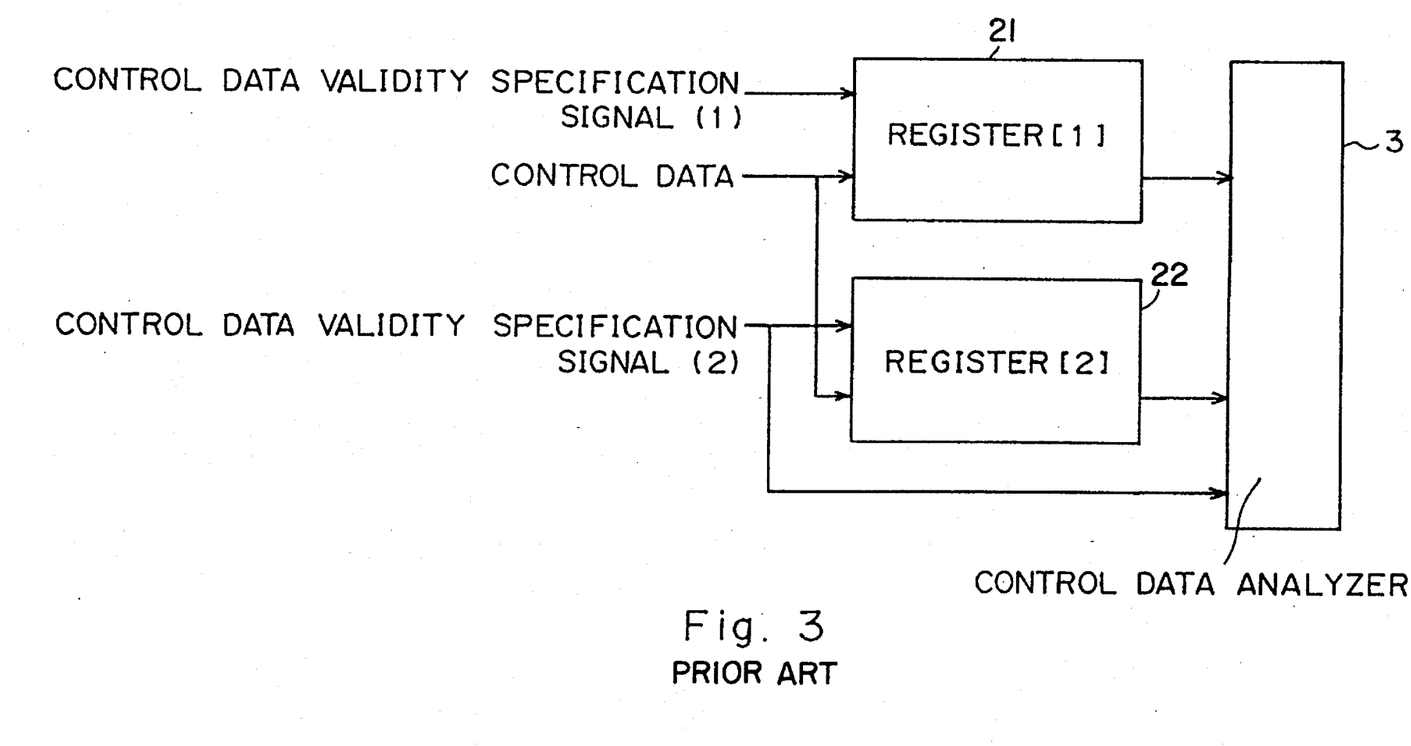
FIG. 3 is a simplified block diagram of a circuit for receiving control data in the SP system 2 in the above example according to the conventional control data transmission system.

FIG. 3 is a simplified block diagram of a circuit in the SP system 2 for receiving control data.

In this example, when control data are not valid, a control data validity specification signal is at an "H" level; and when control data are valid, the control data validity specification signal is at an "L" level.

A register [1] 21 receives the 16 bits in a first half of control data at the fall of a control data validity specification signal (1), and a register [2] 22 receives the 16 bits in a last half of control data at the fall of a control data validity specification signal (2).

When all 32 bits of control data are fully lined up, a control data analyzer 3 for analyzing what the control data request needs to be instructed to start an analysis. In this example, a rise in the control data validity specification signal (2) instructs that the analysis be started.

All 32 bits of control data are not transmitted at once, i.e. m=32 and n=1, in this example, to reduce the number (m+n) of lead lines between the CP system and the SP system.

Incidentally, since an electronic switching system for a conventional narrow band integrated services digital network (N-ISDN) adopts a control data transmission system such as one described earlier, a unit of control data does not comprise more than 32 bits.

However, experience obtained from development indicates that, an electronic switching system for a broadband integrated services digital network (B-ISDN) performs a variety of controls which cannot be handled by only 32 bits. Therefore, a unit of control data can comprise as many as 128 bits.

When a conventional control data transmission system such as the one described earlier exchanges multiple groups of control data, as many as 8 lead lines are required for control data validity specification signals (when a unit of control data has 128 bits). However, 16 lead lines for control data are enough for their own purpose. It is expected that the numbers of bits of control data will further increase with future system enhancement. Therefore, a conventional control data transmission system will need a very large number of lead lines, making the diameters of cables too large and connecting work cumbersome and uneconomical.

SUMMARY OF THE INVENTION

This invention aims at solving such problems by offering a control data transmission system capable of transmitting multiple bits of control signals over fewer lead lines.

A feature of the present invention resides in a control data transmission method for controlling an electronic switching system with fewer signal lines, comprising: a step of splitting unit control data into a plurality of fixed-length bit blocks; a step of generating a control data sequence number specification signal for identifying the fixed-length bit blocks; and a step of emitting the control data sequence number specification signals paired with the corresponding one of control data signals carrying the contents of respective bit blocks and a control data validity specification signal for validating receipt of data in the fixed-length bit blocks.

BRIEF DESCRIPTION OF THE DRAWINGS

FIGS. 4A and 4B are block diagrams for explaining this invention, where

DESCRIPTION OF THE PREFERRED EMBODIMENT

Figure 4A:
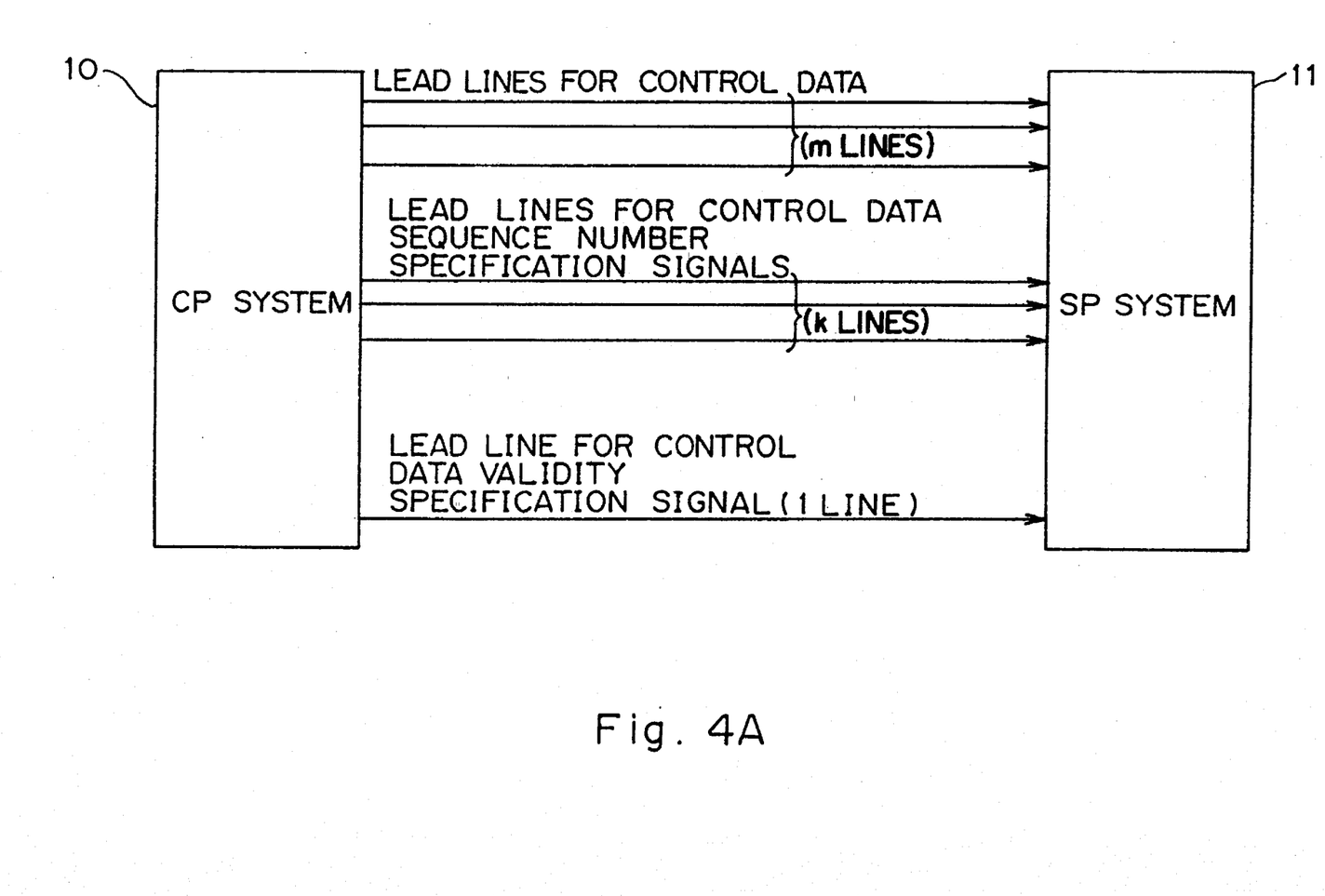
FIG. 4A is a schematic view illustrating the relation between a CP system 10 and an SP system 11 and FIG. 4B is a block diagram showing the CP system and the SP system in more detail.
Figure 4B:
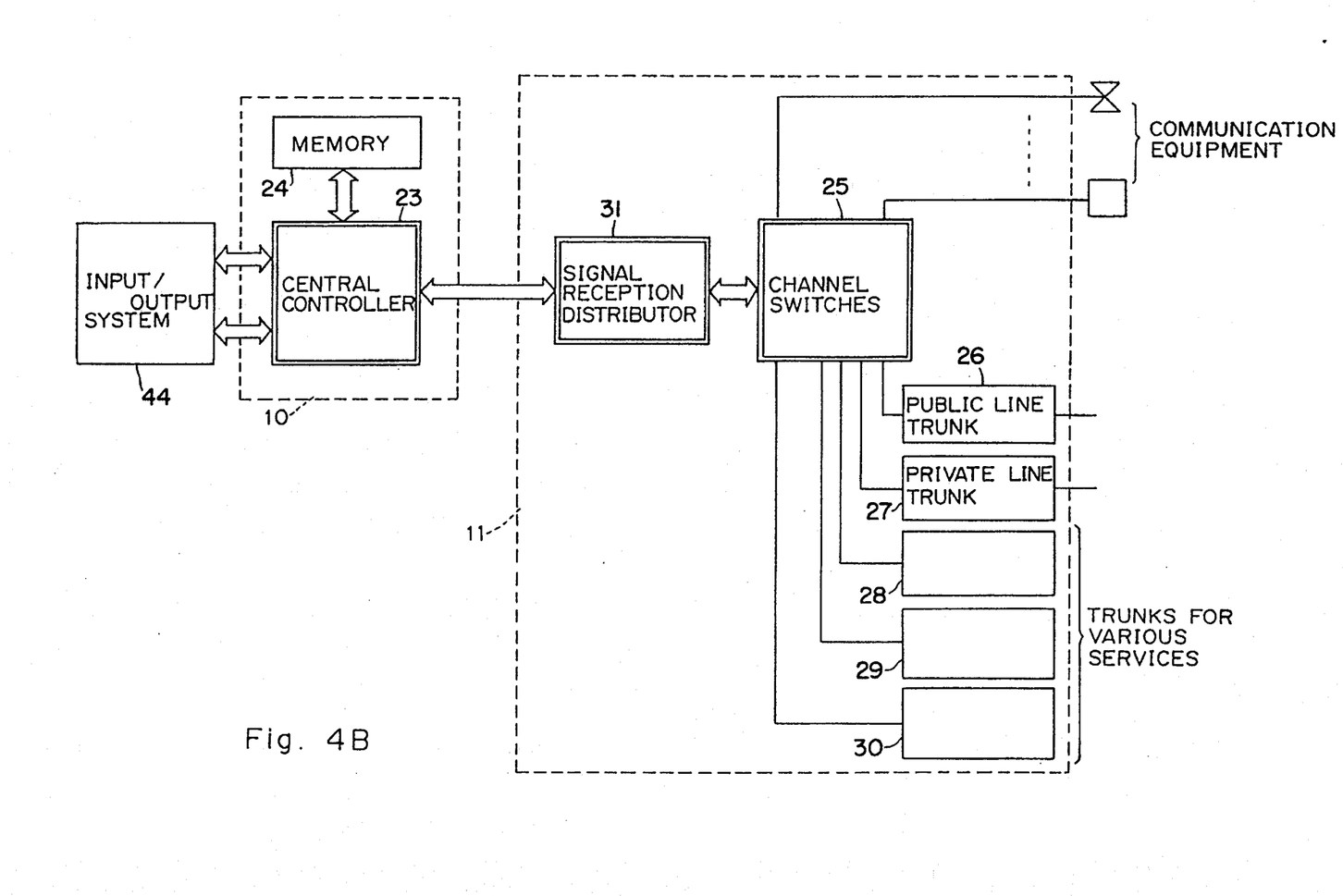

FIGS. 4A and 4B are block diagrams for explaining this invention.

FIG. 4A is a schematic view illustrating the relation between a CP system 10 and an SP system 11.

In FIG. 4A, m lead lines for control data, k lead lines for sequence number specification signals and a lead line for control data validity specification signals connect a CP system 10 with an SP system 11. With this configuration, control data is transmitted from the CP system 10 to the SP system 11.

FIG. 4B is a block diagram showing the CP system 10 and the SP system 11 in more detail.

In FIG. 4B, the CP system 10 comprises a central controller (CC) 23 and a memory (M) 24 and is connected with an I/O system 44 and the SP system 11. The memory (M) 24 stores exchange control programs and information necessary for the central processor (CC) 23 to execute exchange controls.

The SP system 11 comprises channel switches (switches) NW 25, which are connected with telephone sets, modems, facsimile and other communication equipment through trunks, i.e. transmission paths 26–30 such as public 26 and private 27 lines. The channel switches NW 25 are connected with the central controller (CC) 23 through a signal reception distributor (SRD) 31. FIG. 4B shows lead lines for control data, for sequence number specification signals and for control data validity specification signals via the bus connecting the signal reception distributor (SRD) 31 with the central controller (CC) 23. The I/O system comprises an input/output device for maintenance purposes, a typewriter, and a floppy disk drive unit for inputting and outputting data.

This configuration enables the CP system 10 to transmit control data to the SP system 11. As described above, since there are k lead lines for sequence number specification signals, sequence number specification signals can have k bits.

Thus, the number identifiable by sequence number specification signals is $2^k$. Hence, when 128 bits of unit control data are transmitted in 8 units of 16 bits, the currently transmitted block of 8 units is specified by 3 bits in a sequence specification signal. Upon receipt of the sequence number specification signal, the register corresponding to the 3 bits in the sequence number specification signal receives the control data. When all 128 bits of unit control data are lined up, they can be used as in the conventional system. Consequently, although a conventional control data transmission system would have required a total of 24 lead lines, this invention requires only 20 lead lines in all.

As described earlier, since this invention enables fewer lead lines to transmit multiple bits of control signals, it enables an electronic switching system to be built more economically by reducing work in connecting lead lines and failures caused by bad contacts between lead lines.

A preferred embodiment of this invention is explained below by referring to the attached drawings.

In this embodiment, the configuration shown in FIGS. 4A and 4B transmits control data from the CP system 10 to the SP system 11. A case is described, in which 128 bits of unit control data are transmitted in 8 units of 16 bits, i.e. m=16 and k=3.

Figure 5:
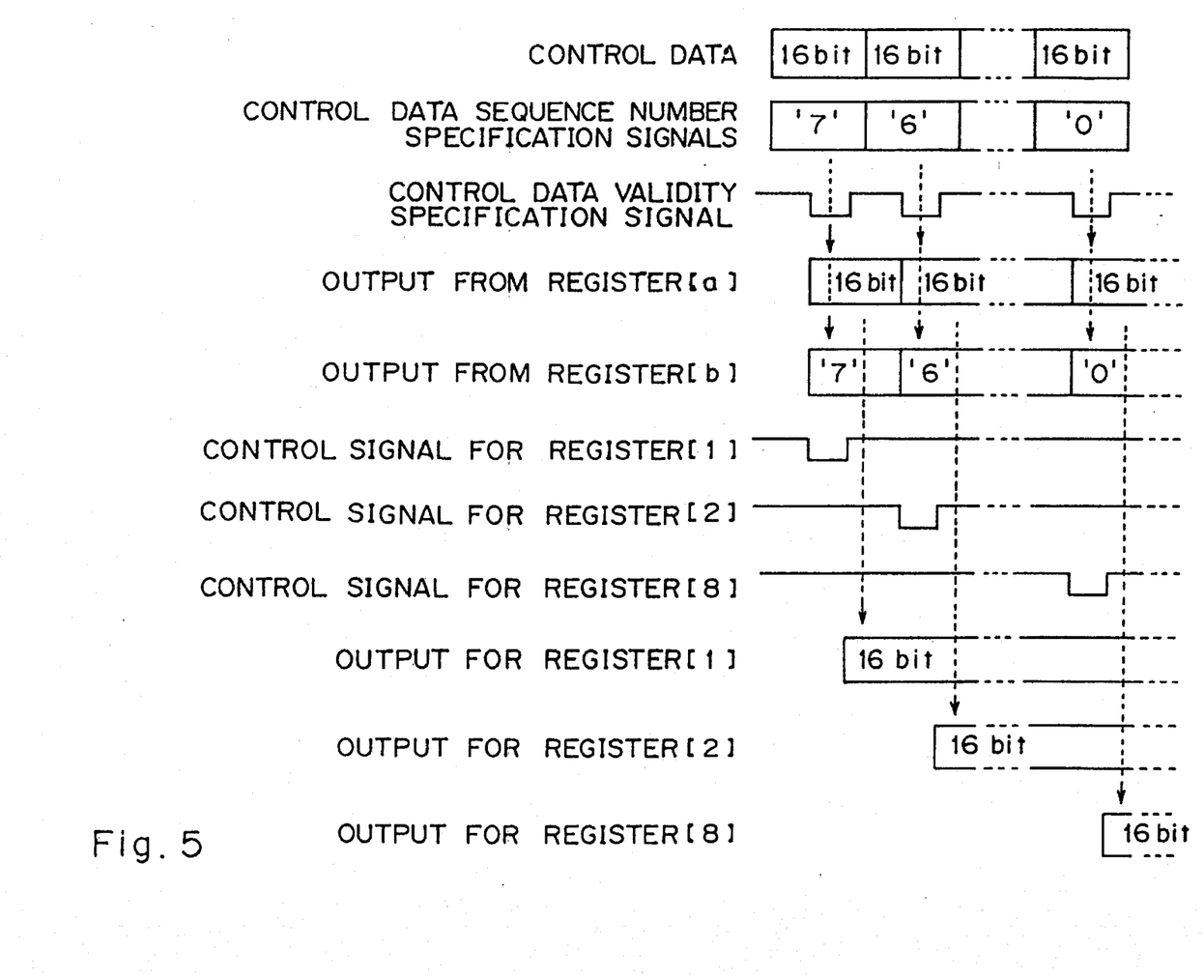
FIG. 5 is a timing chart for explaining the control actions of the control data transmission system according to an embodiment of this invention.

FIG. 5 is a timing chart for explaining its control actions.

Figure 6:
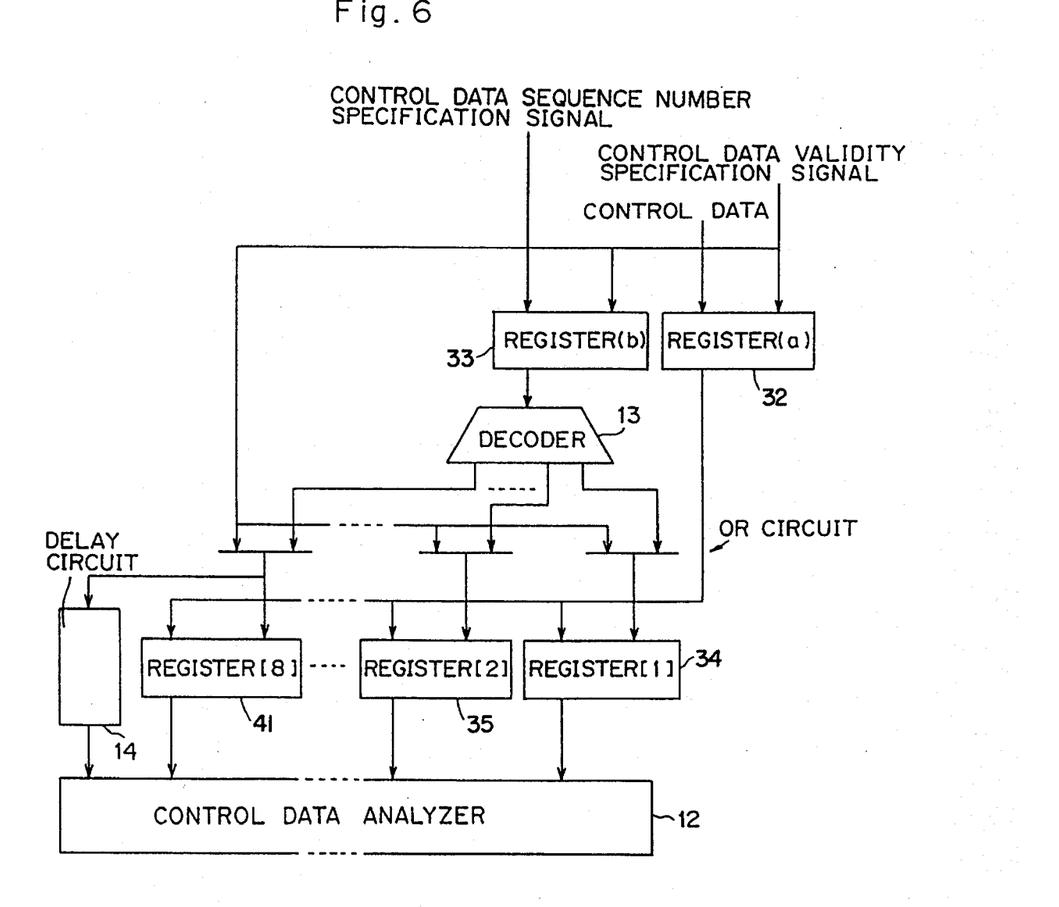
FIG. 6 is a simplified block diagram of a circuit for receiving control data in the SP system 2 in the above example according to the conventional control data transmission system according to the embodiment of this invention.

FIG. 6 is a simplified block diagram of a circuit for receiving control data in the SP system 11 in the above example.

In FIG. 6, a register [a] 32 receives 16-bit control data from lead lines for control data, and a register [b] 33 receives 3-bit control data sequence number specification signals from lead lines for sequence number specification signals. Load control terminals of registers [a] 32 and [b] 33 both receive control data validity specification signals from lead lines for control data validity specification signals. Register [b] 33 can be a 4-bit register by using only 3 bits therein.

Registers [1] 34 through [8] 41 commonly receive outputs from register [a] 32. A control data analyzer 12 receives outputs from registers [1] through [8] 41.

A decoder 13 receives the output from register [b], and has outputs connected to one of the input terminals of each of 8 OR circuits. The other input terminals of these OR circuits receive the control data validity specification signal. Load control terminals of registers [1] through [8] receive respective outputs from the OR circuits.

A delay circuit 14 receives the output from the same OR circuit as the load terminal of register [8]. The control data analyzer 12 receives outputs from the delay circuit and registers [1]–[8]. The circuit configuration shown in FIG. 6 is included in the signal reception distributor (SRD) shown in FIG. 4B. Although the hardware of the CP system 10 can be conventionally configured by a combination of latch circuits and logical circuits, it can also be configured by a microprocessor such as one comprising a CPU, a ROM, a RAM, a parallel input/output port, a clock oscillation circuit, etc.

In the embodiment of this invention illustrated in FIG. 5, as in the conventional control data transmission system illustrated in FIG. 2, when control data are not valid, the control data validity specification signal is at an "H" level, and when control data are valid, the control data validity specification signal is at an "L" level.

When a control data validity specification signal falls, register [a] receives control data, and register [b] receives a control data sequence number specification signal, whose content decrements by "1" for every 16 bits from the initial value "7" for the first 16 bits of control data. Therefore, the control data sequence number specification signal indicates "6" for the second 16 bits of control data, and "0" for the last (eighth) 16 bits.

The decoder 13 receives an output from register [b]. A logical sum OR is obtained from the result decoded by the decoder 13 and a control data validity specification signal. For example, when register [b] outputs "7", a control signal is generated for receiving (loading) data only for register [1]. Registers [1] through [8] receive data, when respective control signals for receiving data rise. Accordingly, register [1] receives the first 16 bits of control data, register [2] receives the second 16 bits of control data, and so forth, until finally register [8] receives the last (eighth) 16 bits of control data.

As a result, when all bits of control data are lined up, they are analyzed to determine what they request, and a corresponding control is performed. The control data analyzer 12 performs the analysis. The control data analyzer 12 needs to know that registers [1] through [8] all have control data. The delay circuit 14 creates a control signal, therefore, by delaying a control signal for receiving data supplied to register [8].

The CP system 10 transmits control data to the SP system 11 in this manner. As described earlier, when 128 bits of unit control data are transmitted in 16 bits 8 times, the control data transmission system according to this invention requires 20 lead lines (comprising 16 lead lines for control data, 1 lead line for control data validity specification signals and 3 lead lines for control data sequence number specification signal), while the conventional control data transmission system requires 24 lead lines (comprising 16 lead lines for control data and 8 lead lines for control data validity specification signals).

Generally, when control data are transmitted in m bits over n times, a conventional control data transmission system requires m+n lead lines. However, a control data transmission system according to this invention requires only (m+1+k) lead lines, where k is the smallest natural number satisfying $2^k \geq n$.

A comparison of the numbers of necessary lead lines between a conventional control data transmission system and one according to this invention is equal to a comparison between m and (1+k). Since (1+k) is far smaller than m when m is large, the superiority of the control data transmission system according to this invention is quite evident in such a case.

What is claimed is

1. A control data transmission method for transmitting control data from a main system to an electronic switching sub-system for control thereof, comprising the steps of:

(a) splitting a unit of the control data into a plurality of fixed-length bit blocks;

(b) generating control data sequence number specification signals respectively identifying the fixed-length bit blocks;

(c) emitting the control data sequence number specification signals, each paired with a corresponding block of control data and a control data validity specification signal for validating receipt of control data;

(d) storing each of the control data sequence number specification signals with the corresponding block of control data upon receipt of the control data validity specification signal in the electronic switching sub-system;

(e) sorting the fixed-length bit blocks of the control data according to the control data sequence number specification signals stored therewith in the electronic switching sub-system; and (f) analyzing the unit of the control data upon completion of steps (a)–(e).

2. A switching system control data transmission apparatus, comprising:

a central controller in a main system to split a unit of control data into a plurality of fixed-length bit blocks and generate control data sequence number specification signals respectively identifying the fixed-length bit blocks, each set of control data sequence number specification signals output with a corresponding block of control data and a control data validation specification signal for validating the corresponding block of control data; and a signal reception distributor in a sub-system operatively connected to said central controller, said signal reception distributor comprising:

a decoder, operatively connected to said central controller, to decode the control data sequence number specification signals;

registers, operatively connected to said decoder and said central controller, each storing contents of one of the fixed-length bit blocks of control data and the control data validity specification signal corresponding thereto under control of said decoder; and a control data analyzer, operatively connected to said decoder and said registers, to analyze the contents of the fixed-length bit blocks forming one unit of control data.

3. A control data transmission apparatus for transmitting control data from a main system to an electronic switching sub-system for control thereof, comprising:

means for splitting a unit of the control data into a plurality of fixed-length bit blocks;

means for generating control data sequence number specification signals respectively identifying the fixed-length bit blocks;

means for emitting the control data sequence number specification signals, each paired with a corresponding block of the control data and a control data validity specification signal for validating receipt of control data;

means for identifying the fixed-length bit blocks by converting the control data sequence number specification signals into at least one identification signal;

means for storing contents of the fixed-length bit blocks of the control data according to the at least one identification signal and the control data validity specification signal; and means for analyzing the contents of all of the fixed-length bit blocks of the control data when the unit of the control data is stored.

4. The control data transmission apparatus according to claim 3, wherein the main system includes a central controller controlling said splitting means, said generating means and said emitting means and the electronic switching sub-system includes a signal reception distributor, wherein said control data transmission apparatus further comprises means for coordinating the main system, including the central controller, with the electronic switching sub-system equipped with the signal reception distributor, wherein said identifying means comprises a decoder, operatively connected to said generating means, in the signal reception distributor to decode the control data sequence number specification signals, wherein said storing means comprises registers, operatively connected to said emitting means, in the signal reception distributor to store the contents of the fixed-length bit blocks of control data according to the identification signal and the control data validity specification signal, and wherein said analyzing means comprises a control data analyzer, operatively connected to said decoder and said registers in the signal reception distributor, to analyze the contents of all of the fixed-length bit blocks of the control data when one unit of the control data is stored.

* * * * *

UNITED STATES PATENT AND TRADEMARK OFFICE
CERTIFICATE OF CORRECTION

PATENT NO. : 5,532,682
DATED     : July 2, 1996
INVENTOR(S) : Masami MURAYAMA, et al.

It is certified that error appears in the above-indentified patent and that said Letters Patent is hereby corrected as shown below:

Column 3, line 65, after [1], insert --34--.

Signed and Sealed this

Seventeenth Day of September, 1996

Attest:

BRUCE LEHMAN

*Attesting Officer*       *Commissioner of Patents and Trademarks*